Feb. 25, 1930. A. T. MAXIMOFF 1,748,722
PRODUCTION OF ERYTHRENE AND ITS HOMOLOGUES FROM DERIVATIVES OF GLYCOLS
Filed May 18, 1926
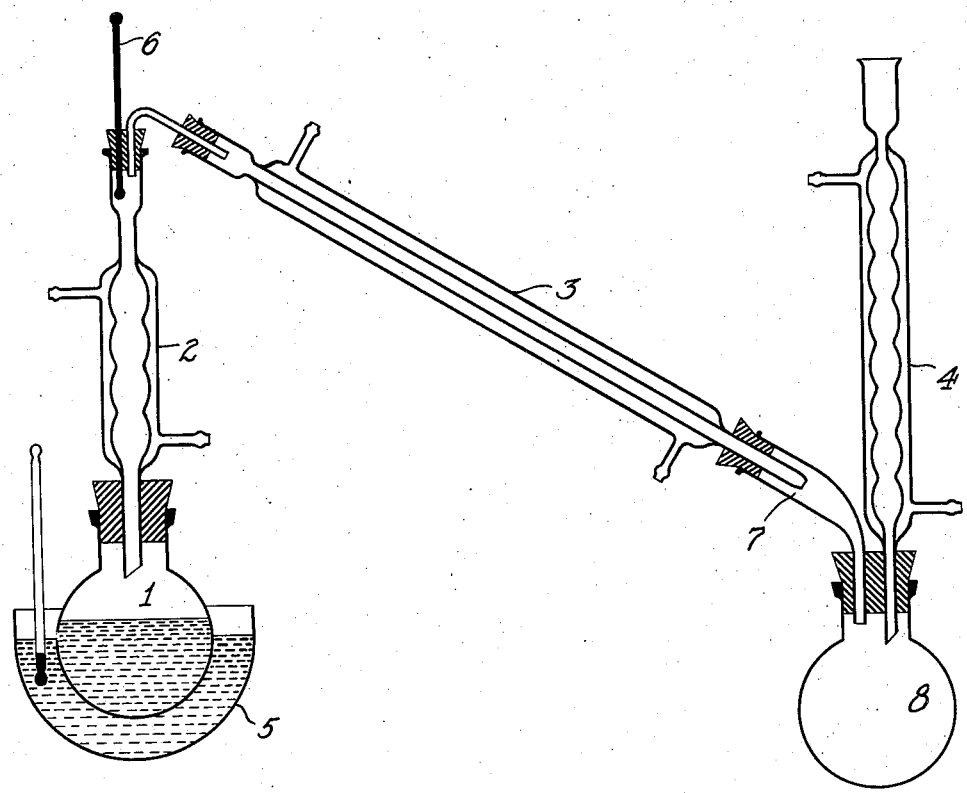
ALEXANDER T. MAXIMOFF INVENTOR
BY
ATTORNEY Patented Feb. 25, 1930

1,748,722

UNITED STATES PATENT OFFICE

ALEXANDER T. MAXIMOFF, OF NEW YORK, N. Y., ASSIGNOR TO THE NAUGATUCK CHEMICAL COMPANY, OF NAUGATUCK, CONNECTICUT, A CORPORATION OF CONNECTICUT

PRODUCTION OF ERYTHRENE AND ITS HOMOLOGUES FROM DERIVATIVES OF GLYCOLS

Application filed May 18, 1926. Serial No. 109,892.

Dimethyl erythrene has been produced from pinacol by treating the latter with sulphuric acid, phosphoric acid and various sulphates, bisulphates, pyrosulphates, which have an acid reaction. Another method has been produced which consists in heating pinacol hydrate, and particularly pinacol anhydride in the presence of amino-sulphonic acids, for instance sulphanilic acid. This last mentioned method, as proposed, requires the use of 200–240% of sulphanilic acid calculated on the weight of the pinacol anhydride.

The present invention is concerned with an improvement in the pinacol anhyride-sulphanilic acid method of forming dimethyl erythrene, and this is the primary object of the invention. The invention also aims to reduce the cost of manufacturing dimethyl erythrene for synthetic rubber by effecting an economy in the amount of sulphanilic acid required. Another object is to produce erythrene and its homologues from glycol derivatives by the improved amino-sulphonic acid method.

Briefly described the invention consists in adding approximately 1% by weight of sulphanilic acid to 100 parts by weight of pinacol anhydride and heating the mixture at 140–180° C., conducting away the dimethyl erythrene and water and other products through a reflux condenser which is kept at 96°–100° approximately, and then through a condenser, and separating the dimethyl erythrene from the other reaction products.

For operating on a small scale it will suffice to assemble the apparatus illustrated in the drawing. A round bottom flask 1 of 500 cc. capacity is placed in an oil bath 5. To the flask 1 is vertically attached a reflux condenser 2 in the top of which is inserted a thermometer 6 and a bent tube which connects with a second condenser 3, such as a Liebig condenser which is slanted downward and connected through an adapter tube 7 into a second 500 cc. receiver flask 8. A third reflux condenser 4 is connected vertically to the second flask 8 to guard against loss of dimethyl erythrene from the receiver. For larger scale operations, such as would be required in the commercial production of dimethyl erythrene, the same principle of construction may be employed as has been briefly outlined above with ordinary laboratory stock apparatus. However, the invention is not limited to any specific arrangement of apparatus, but is more concerned with the operating conditions.

Pinacol anhydride is placed in the flask 1 in the oil bath and to it is added 1–2% by weight of sulphanilic acid, either the technical or the chemically pure grade. The temperature of the first vertical reflux condenser 2 is controlled by passing heated water through the outer jacket in order that the temperature of the inner shell may be maintained between 90°–100° C. and preferably between 96–100° C. The temperature of the bath is raised to 150–180° C. and after a few minutes the pinacol anhydride begins to boil and to form dimethyl erythrene. As the evolved materials pass up through the vertical condenser 2 and over through the second condenser 3, the latter becomes warm, and requires cooling. Care must be taken however that the temperature in this second slanting condenser 3 does not fall below say 42–47° C. Otherwise the condenser 3, as well as the adapted tube 7 connected to it, may become clogged by the pinacol hydrate which is carried out of the distilling flask 1 by the water vapor and the dimethyl erythrene. The temperature of the oil bath 5 is kept at 140–180° C. With the size of the flask above mentioned the dimethyl erythrene and other reaction products should be distilled at a rate of 60–100 drops per minute. If too much liquid starts to collect in the vertical condenser 2 attached to the distilling flask 1, it is necessary to drop the temperature of the bath 5 somewhat. The second flask 8, located at the end of the slanting condenser 3, receives the condensed dimethyl erythrene, the water which is split off from the pinacol anhydride, also some pinacol hydrate and pinacoline. Ketone oils may be present if the pinacol has not been originally freed from them. The receiving flask 8, after the reaction has been stopped, is thoroughly cooled. Towards the end of the reaction, it is desirable to raise the temperature of the oil bath 5 in order to distill over the last traces of dimethyl erythrene. After cooling the receiver 8, the dimethyl erythrene and water may be decanted from the pinacol hydrate. The water may be separated from the dimethyl erythrene by means of a separatory funnel. It is of course understood that the above temperatures are not absolute limits, but are capable of such variation as will permit the reaction to progress smoothly and without clogging of any of the parts of the apparatus.

In order to accomplish a complete separation of dimethyl erythrene from pinacol hydrate, the latter may be dissolved in lukewarm water, or better in water saturated with pinacol. A fractional distillation may then be carried out on the dimethyl erythrene in order to give it a further purification. The fraction boiling between 65–85° C. will contain in the neighborhood of 85–90% of dimethyl erythrene. The following is an illustration of specific proportions. Using a flask of 500 cc. capacity and a bath temperature of 150°–180° C., 391.4 grams of pinacol anhydride and say 4 grams or more of sulphanilic acid were introduced into the flask. The reaction required 2¼ hrs., at the end of which time approximately 383 grams of the product were collected in the receiver. Decantation and separation from the pinacol hydrate and water yielded, after drying with calcium chloride, 250 grams of crude dimethyl erythrene and about 73 grams of pinacol hydrate.

Distillation of the crude product obtained in the above illustration gave the following yields:

|  | Grams |
|---|---|
| Fraction at 65–85° | 155.9 |
| Fraction at 85–100° | 17.5 |
| Fraction at 100–115° | 49.3 |
| Residue in flask | 26.4 |

The fraction obtained at 65–85 will consist of nearly pure dimethyl erythrene, containing a small amount of pinacoline. The fraction 85–100° contains 40–45% of dimethyl erythrene, while the third fraction, 100–115° contains substantially pure pinacoline, together with pinacol and ketone oils. The residue in the flask contains approximately 12% of pinacol and ketone oils.

The dimethyl erythrene in the 65–85° fraction may be used for the production of synthetic rubber. It is preferably purified by redistillation with 1% of sodium. After two such distillations the dimethyl erythrene will be substantially pure, practically all of it boiling between 68.7 and 68.9° C.

When it is considered that according to the previously described method of producing dimethyl erythrene from pinacol anhydride by heating with 200–240% of sulphanilic acid, it becomes readily apparent that the present embodiment in which but 1% by weight of sulphanilic acid is required, permits of a striking economy in the production of dimethyl erythrene from pinacol anhydride. As contrasted with the previous method which required the occasional addition of sulphuric acid, the present embodiment does not require the addition of any sulphuric acid. To carry out the operation as a continuous process the pinacol anhydride and amino sulphonic acid should be introduced at approximately the same rate at which the erythrene compound and the by products are evolved. With proper apparatus the operation may be made substantially continuous. The pinacol in the residue and the pinacol hydrate which is formed during the reaction may be returned to other stages of the process for producing dimethyl erythrene from pinacol.

The improvement accomplished by the present invention appears to reside in continuously and completely removing the water which is split off from the anhydride and during the whole process.

Instead of dimethyl erythrene, erythrene or other of its homologues may be obtained according to the same method by substituting the proper raw material. For example, 1–3 butylene glycol will yield erythrene, dimethyl diphenyl ethylene glycol will yield diphenyl erythrene. Instead of sulphanilic acid other amino sulphonic acids may be used.

Having thus described my invention, what I claim and desire to protect by Letters Patent is:

1. An improvement in the method of obtaining erythrene and its homologues from anhydrides of substituted glycols which comprises treating the glycol anhydride with less than approximately 2% of an amino sulphonic acid, heating to approximately 140–180° C., continuously conducting the evolved products away from the reacting mass at temperatures between approximately 90 and 100° C., and condensing the vaporous products in excess of approximately 42° C.

2. An improvement in the method of obtaining erythrene and its homologues from anhydrides of substituted glycols which comprises treating the glycol anhydride with less than approximately 2% of an amino sulphonic acid, heating to approximately 140–180° C., continuously conducting the evolved products away from the reacting mass at temperatures between approximately 96 and 100° C., and condensing the vaporous products at temperatures above the solidifying point of the glycol by products which are formed.

3. An improvement in the method of obtaining erythrene and its homologues from anhydrides of substituted glycols which comprises treating the glycol anhydride with less than approximately 2% of an amino sulphonic acid, heating to approximately 140–180° C., continuously conducting the evolved products away from the reacting mass at temperatures between approximately 96° and 100° C., and condensing the vaporous products in excess of approximately 42° C.

4. An improvement in the method of obtaining erythrene and its homologues from anhydrides of substituted glycols which comprises treating the glycol anhydride with less than approximately 2% of sulphanilic acid, heating to approximately 140–180° C., continuously conducting the evolved products away from the reacting mass at temperatures between approximately 96° and 100° C., and condensing the vaporous products at temperatures in excess of approximately 42° C.

5. An improvement in the method of obtaining dimethyl erythrene from pinacol anhydride which comprises treating the pinacol anhydride with not more than approximately 2% of sulphanilic acid, heating to 140–180° C., continuously conducting the evolved products away from the reacting mass at temperatures between 96.°–100° C., said pinacol anhydride and sulphanilic acid being introduced at approximately the same rate at which the dimethyl erythrene and the products are evolved.

Signed at New York, county and State of New York, this 5th day of May, 1926.

ALEXANDER T. MAXIMOFF.